Feb. 9, 1971     A. BLOCK     3,561,173
QUICK CHANGE ABRASIVE FLAP WHEEL WITH
SELF-CONTAINED COUPLING MEANS
Filed June 20, 1968     2 Sheets-Sheet 1
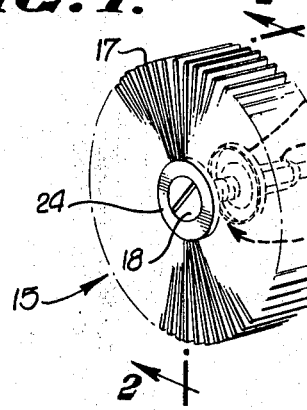
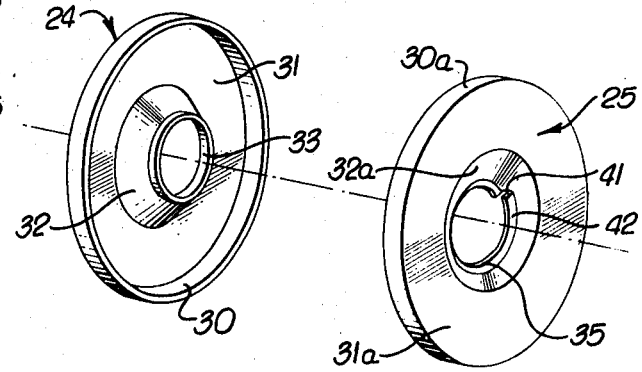
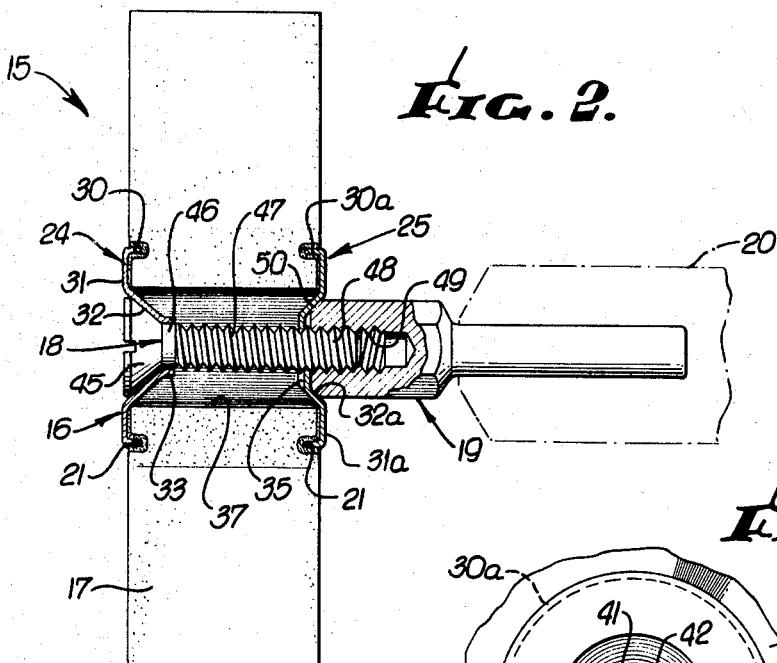
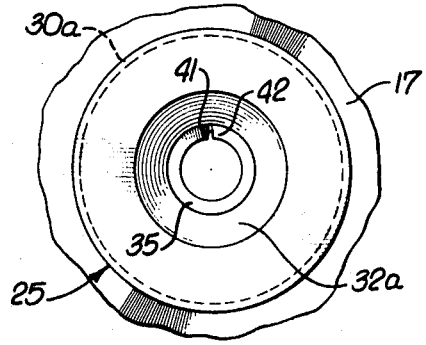
INVENTOR.
ALECK BLOCK
By Huebner & Worrel
ATTORNEYS.

Feb. 9, 1971 A. BLOCK 3,561,173
QUICK CHANGE ABRASIVE FLAP WHEEL WITH
SELF-CONTAINED COUPLING MEANS
Filed June 20, 1968 2 Sheets-Sheet 2
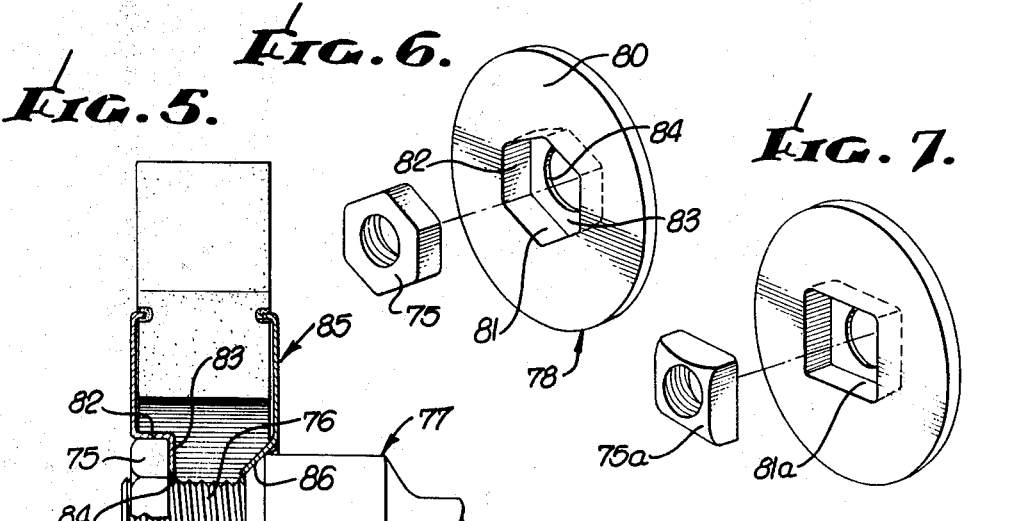
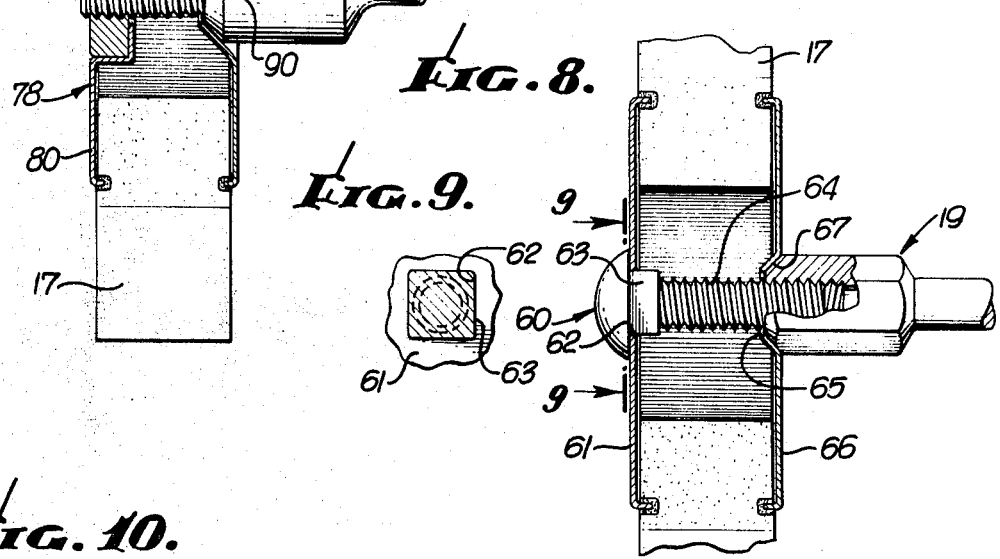
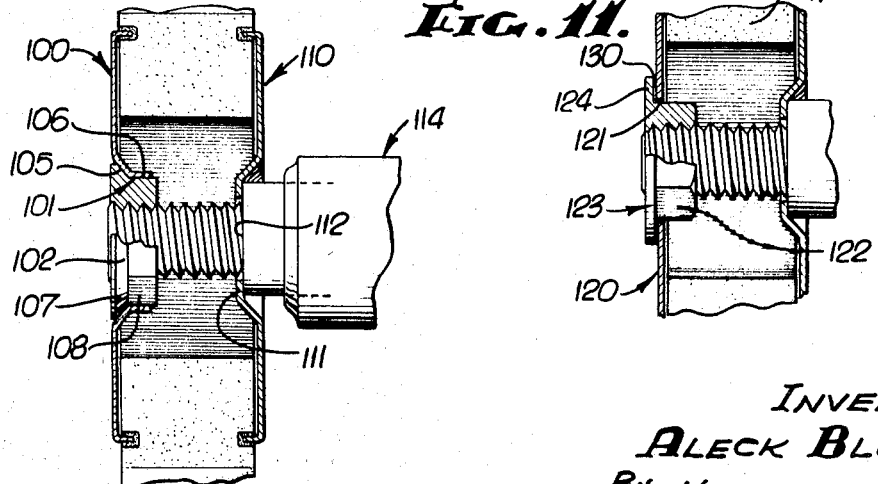
INVENTOR.
ALECK BLOCK
By Huebner & Worrel
ATTORNEYS.

United States Patent Office 3,561,173
Patented Feb. 9, 1971

3,561,173
QUICK CHANGE ABRASIVE FLAP WHEEL WITH SELF-CONTAINED COUPLING MEANS
Aleck Block, West Los Angeles, Calif., assignor, by mesne assignments, to Merit Abrasive Products, Inc., a corporation of California
Filed June 20, 1968, Ser. No. 738,630
Int. Cl. B24b 9/02
U.S. Cl. 51—334    4 Claims

ABSTRACT OF THE DISCLOSURE

A wheel for grinding, polishing or buffing which is adapted for rapid installation on or removal from a power rotatable spindle or arbor without the use of tools, comprising a hub formed of axially spaced apart plates of thin but stiff metal or other suitable material, the plates cooperating with the inner end sections of abrasive leaves or polishing or buffing leaves to mount them in a radial circular pattern, and at least one of the plates being employed to mount a male threaded element adapted to be screwed on or off a complementary threaded end section of the spindle or arbor.

BACKGROUND OF THE INVENTION

It is known in the art of solid grinding wheels to fit a nut into the wheel or mount a nut on the side of the wheel for securing the wheel on a shaft with a threaded end.

In buffing wheels it is known to provide a solid hub for mounting the soft cloth material with a hole through the hub which is threaded. Common to these grinding wheels and buffing wheels is the fact that the threaded part is either through a solid center portion of the wheel or is attached by welding or otherwise to the side of a solid hub.

There is a class of wheels formed of abrasive leaves permanently mounted on a hub made up of thin metallic plates or discs spaced apart and lying generally in the planes of the edges of the leaves. These discs have axially aligned holes enabling the wheel to be slipped on to a spindle, and a nut is then screwed on the spindle against the outside disc to secure the wheel on the spindle. This entails two operations, first placing the wheel on the spindle, then applying and tightening the nut by the use of a wrench. If the nut is lost or the wrench not handy, additional delay is encountered.

SUMMARY OF THE INVENTION

The present invention has for its primary objective, a flap wheel construction of lightweight, disposable type, which can be installed on a spindle simply by threading it on and applying the necessary manual twist to the wheel itself to tighten it; then to reverse the operation when the wheel is worn out and to be discarded, or removed for any other purpose.

The present invention provides for this function in a wheel wherein abrasive leaves are mounted on a hub formed of thin spaced apart plates which by reason of fraility and limited mutual surfaces do not lend themselves to the expedient of welding a threaded member thereto.

The object is further accomplished by providing a threaded member frictionally or adhesively secured to the hub and treated as a permanent part thereof. For installation on a spindle with a threaded socket, the member may be a screw or bolt extending through both plates of the hub and retained by an upset of the metal adjacent the aperture to form a fragmentary thread with a pitch preferably different than that of the screw or bolt to cause a frictional binding for retention. Where the installation is to be on a male threaded spindle, a nut may be press fitted into the metal of the plate at the aperture.

BRIEF DESCRIPTION OF THE DRAWINGS

FIG. 1 is a perspective view of a flap wheel embodying the invention in the form where the threaded member is a screw.

FIG. 2 is an enlarged section taken on the line 2—2 of FIG. 1.

FIG. 3 is a fragmentary side elevation of the wheel of FIG. 1 without the screw.

FIG. 4 is an exploded view of the two plates which form the hub of the wheel shown in FIG. 3.

FIG. 5 is a section of a second form of wheel wherein the threaded member is a hexagonal nut.

FIG. 6 is an exploded view of the nut and cooperating plate of FIG. 5.

FIG. 7 is a view similar to FIG. 6 illustrating a square nut instead of a hexagonal type.

FIG. 8 is a section showing a stove bolt with its square shank section press fitted into a hub plate.

FIG. 9 is a fragmentary section taken on the line 9—9 of FIG. 8.

FIG. 10 is a section showing a hexagonal nut with a tapered flange press fitted into a hub plate.

FIG. 11 is a section showing a hexagonal nut with a flat flange press fitted or adhesively bonded to a hub plate.

DESCRIPTION OF THE PREFERRED EMBODIMENT

Referring to FIGS. 1–4, there is illustrated a flap wheel 15 comprising a hub 16 mounting a plurality of abrasive leaves 17 forming an annulus of sheets, and a threaded member 18 for installing the wheel on a power rotatable spindle 19. The latter may be held in a tool chuck 20.

The leaves are notched on both edges near their inner ends as shown at 21, to provide annular side grooves for engagement with hub elements hereinafter described.

The hub 16 includes a pair of annular plates 24 and 25. These are made of relatively thin metal or other thin but stiff material, for example, a suitable plastic. These plates will be identified hereinafter as "outer" and "inner," the former being spaced away from the rotatable spindle 19 and the latter seating upon it.

The outer plate 24 includes a peripheral flange or rim 30, a flat web section 31, a tapered seat 32, and an inner flange 33.

The inner plate 25 includes a peripheral flange or rim 30a, a flat web section 31a, a tapered seat 32a, and a central female thread element 35.

The inner flange 33 and the thread element 35 provide apertures which are coaxial.

In assembling the leaves and hub, the inner ends of the leaves may have an epoxy or other suitable cement applied thereto, they are arranged in an annular array on the inside of one plate with the notches of the leaves engaging the flange 30 or 30a, as the case may be. The other plate is then brought into a position complementary to the first plate. At any convenient time during assembly, an additional coating of epoxy 37 may be added to the inner ends of the assembled leaves to form a continuous annular binding of leaves and plates into a unit.

The thread element 35 is formed by a cut 41 in the metal, and upsetting or forcing the metal at one side of the cut in an axial direction to provide a fragmentary spiral thread 42.

The screw 18 has a tapered head 45 which seats in the seat 32, and a round shoulder 46 which closely fits the inner flange 33. It is provided with a threaded shank 47 which extends through and beyond the plate 25, so that an extension 48 is available for threading into the threaded socket 49 of the spindle 19.

It is preferable that the pitch of the thread 42 be slightly different from that of the screw shank 47 so that a binding or "lock nut" effect, commonly designated an interference fit, is obtained.

The screw 18 is intended to be a permanent part of the wheel 15, and the securement of the screw in the hub is tight enough that unintentional dislodgement of the screw is not likely to occur, and moreover, that the screw will turn with the hub when the wheel is rotated by hand to remove it from the spindle.

To this end, when the screw is installed, it is drawn tightly into the hub, tending to pull the two hub plates 24 and 25 toward each other. This compacts the assembly.

It should be noted that a shoulder 50 on the spindle 19 abuts against the tapered seat 32a. This, in combination with the surface engagement of the tapered screw head 45 against the tapered seat 32, affords a good radial dispersion of torque imparted by the spindle to the hub of the wheel.

The threads of the screw are disposed so that when rotated in the working direction, the threaded connection tightens. When the wheel is stopped, and it is desired to remove it from the spindle, it is very simple to grasp the wheel, break the connection with the spindle, and spin the wheel off. The wheel itself functions as a "wrench."

OTHER FORMS

Another form of wheel employing a male threaded member for coupling with a spindle socket is shown in FIGS. 8–9.

In that, a stove bolt 60 is mounted with a press fit in a flat hub plate 61. The flat side of the head bears against the outer surface of the plate. The latter has a square aperture 62 of such dimension that the flat section 63 of the bolt is held tightly therein. The threaded shank 64 of the bolt extends through an aperture 65 of the opposite plate 66 which is preferably formed with a tapered seat 67 against which the shouldered spindle 19 bears. If desired, a suitable adhesive may be interposed between the flat side of the bolt head and the adjacent surface of the plate, similar to the illustration in FIG. 11, later referred to.

Turning now to FIGS. 5–6, there is illustrated a form of the invention wherein a nut 75 is made a part of the wheel, and it receives a threaded male element 76 on a spindle 77.

In this case, hub plate 78 includes a marginal flat area 80, with a central socket or pocket 81 having flat sided walls 82 in hexagonal configuration, terminating in a flat flange 83 with an annular aperture 84.

Dimensions of nut and pocket are such that the nut is press fitted in the pocket with sufficient tightness to remain as a part of the wheel throughout its use, and upon removal form the spindle. The opposite hub plate 85 preferably includes a tapered seat 86 for engagement with a tapered shoulder 90 of the spindle 77.

FIG. 7 illustrates a construction employing a square nut 75a in a square flange pocket 81a, the other parts being similar to the construction of FIGS. 5–6.

FIG. 10 shows an alternative form of wheel for use with a male threaded spindle. In this form, hub plate 100 embodies a socket or cavity 101 for a nut 102 of special design.

The cavity is provided by a tapered seat 105 merging into a hexagonal sleeve 106. The nut is formed with a tapered flange 107 (which may be annular), and a hexagonal body 108. The flange 107 has an axial thrust engagement with the tapered seat 105 and the body 108 has a press fit in the sleeve 106.

The opposite hub plate 110 may include an inwardly offset flat seat 111 against which a flat end shoulder 112 of a spindle 114 bears.

In FIG. 11, the hub plate 120 is flat and contains a hexagonal opening or socket 121 for the press fit of a body 122 of a nut 123. In this alternative, the nut is made with a flat sided flange 124 which engages the outer surface of the hub plate 120. Instead of relying on a press fit to retain the nut in the socket, the nut may be secured by adhesive 130.

All forms shown and described utilize relatively thin hub plates, spaced a relatively large distance apart, contributing to lightness and economy. The former feature is useful for handling and operation. The latter is essential to the convenience of discarding the entire wheel when the abrasive leaves have worn out.

The construction in all forms contemplates a liberal surface contact between a hub plate and the threaded member, and a compressive force between hub plates tending to impart an integral effect and consequent distribution of torque during operation. The threads run in a direction to tighten the coupling to the spindle when the wheel is rotated in operating direction.

Although frictional retention or press fit between a hub plate and the threaded coupling element appears to be preferable, where complementary surfaces are adequate an epoxy or other suitable adhesive may be employed to bond hub plate and threaded coupling element together.

The term "abrasive leaves" as used in the claims is intended to comprehend flexible paper or other sheet material coated with abrasive particles or otherwise treated to perform grinding, finishing, cleaning, polishing, surface smoothing or deburring of metals and other materials worked on.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

What I claim is:

1. A quick change abrasive flap wheel adapted for installation on or removal from, without the use of tools, a power rotatable spindle having an end including a shoulder, and an internally threaded axial bore, said flap wheel comprising:

an annulus of radially disposed flaps of coated abrasive sheets, including an annular groove on each side of said annulus adjacent the radially inner ends of said flaps;

an outer hub plate of relatively thin metal, said plate having an outer peripheral edge formed into a cylinder mating with one of said annular grooves; and having an opening at its center coaxial with said spindle;

an inner hub plate of relatively thin metal, said plate having an outer peripheral edge formed into a cylinder mating with the other of said annular grooves; having its central part axially displaced from a radial plane to provide an annular surface mating with said spindle shoulder to seat said abrasive flap wheel coaxially on said spindle; and having an opening at the center coaxial with said spindle;

a screw having a head seating on said outer plate, and a threaded shank closely received in said axial hub openings and projecting from said inner hub plate for threaded reception into said spindle bore; and a thread element formed in the edge of said inner hub plate peripheral to said central opening, said edge being slit in a substantially radial direction, and the metal near said opening being displaced axially into a spiral thread making an interference fit with the threads of said screw.

2. A flap wheel as described in claim 1 in which the central part of said outer hub plate is inwardly displaced to form a recess accommodating the head of said screw.

3. A flap wheel as described in claim 1 in which said screw is threadably tightened into said inner hub plate to lock said wheel into assembly with a compressive force between said hub plates.

4. A flap wheel as described in claim 1 in which adhesive material is used to bond said screw to at least one of said hub plates.

References Cited
UNITED STATES PATENTS

| | | | |
|---|---|---|---|
| 609,325 | 8/1898 | Boasso | 151—45X |
| 2,487,330 | 11/1949 | Green | 151—68X |
| 2,560,518 | 7/1951 | Amesbury | 85—32(INT) |
| 2,651,894 | 9/1953 | Leggett | 51—337 |
| 2,996,851 | 8/1961 | Gianatasio | 51—378 |
| 3,279,518 | 10/1966 | Bollinger | 151—68X |
| 3,406,488 | 10/1968 | Rykken | 51—337 |
| 3,410,586 | 11/1968 | Gervais | 287—53 |

OTHELL M. SIMPSON, Primary Examiner